(12) United States Patent
Chopra et al.

(10) Patent No.: US 9,012,527 B2
(45) Date of Patent: Apr. 21, 2015

(54) CURABLE COMPOSITIONS FOR THREE-DIMENSIONAL PRINTING

(71) Applicant: Xerox Corporation, Norwalk, CT (US)

(72) Inventors: Naveen Chopra, Oakville (CA); Michelle N. Chretien, Mississauga (CA); Barkev Keoshkerian, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/070,013

(22) Filed: Nov. 1, 2013

(65) Prior Publication Data

US 2014/0053754 A1 Feb. 27, 2014

Related U.S. Application Data

(62) Division of application No. 12/765,309, filed on Apr. 22, 2010, now Pat. No. 8,603,612.

(51) Int. Cl.
| | |
|---|---|
| *C08F 2/46* | (2006.01) |
| *C08G 61/04* | (2006.01) |
| *C09D 11/30* | (2014.01) |
| *C09D 11/101* | (2014.01) |
| *C09D 11/34* | (2014.01) |

(52) U.S. Cl.
CPC ............ *C09D 11/30* (2013.01); *C09D 11/101* (2013.01); *C09D 11/34* (2013.01)

(58) Field of Classification Search
CPC .............................. C09D 11/101; C09D 11/30
USPC .............................................. 522/3, 1; 520/1
See application file for complete search history.

(56) References Cited

U.S. PATENT DOCUMENTS

| | | | |
|---|---|---|---|
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | Williams et al. | |
| 5,372,852 A | 12/1994 | Titterington et al. | |
| 5,389,958 A | 2/1995 | Bui et al. | |
| 5,621,022 A | 4/1997 | Jaeger et al. | |
| 5,783,657 A | 7/1998 | Pavlin et al. | |
| 6,111,055 A | 8/2000 | Berger et al. | |
| 6,994,845 B2 | 2/2006 | Mattai et al. | |
| 7,270,408 B2 | 9/2007 | Odell et al. | |
| 7,276,614 B2 | 10/2007 | Toma et al. | |
| 7,279,587 B2 | 10/2007 | Odell et al. | |
| 7,559,639 B2 | 7/2009 | Belelie et al. | |
| 7,563,489 B2 | 7/2009 | Carlini et al. | |
| 7,632,546 B2 | 12/2009 | Odell et al. | |
| 7,699,918 B2 * | 4/2010 | Odell et al. | 106/31.13 |
| 8,084,637 B2 | 12/2011 | Chopra et al. | |
| 8,097,661 B2 | 1/2012 | Chopra et al. | |
| 8,507,584 B2 | 8/2013 | Chopra et al. | |
| 2003/0065084 A1 | 4/2003 | MacQueen et al. | |
| 2005/0074260 A1 * | 4/2005 | King et al. | 399/222 |
| 2006/0119686 A1 | 6/2006 | Odell | |
| 2007/0123606 A1 * | 5/2007 | Toma et al. | 523/160 |
| 2007/0142492 A1 | 6/2007 | Odell et al. | |
| 2008/0122914 A1 | 5/2008 | Toma et al. | |
| 2008/0218540 A1 | 9/2008 | Iftime et al. | |
| 2010/0007692 A1 * | 1/2010 | Vanmaele et al. | 347/21 |
| 2010/0055484 A1 | 3/2010 | Chretien et al. | |

FOREIGN PATENT DOCUMENTS

| | | | |
|---|---|---|---|
| CA | 2 676 879 | | 3/2010 |
| EP | 2 161 137 | | 3/2010 |
| WO | 2008/077850 | * | 3/2008 |

OTHER PUBLICATIONS

U.S. Appl. No. 11/683,011, filed Mar. 7, 2007 to Iftime et al.
U.S. Appl. No. 12/204,307, filed Sep. 4, 2008, to Chretien et al.
U.S. Appl. No. 12/474,946, filed May 29, 2009 to Chretien et al.
"Dimer Acids," Kirk-Othmer Encyclopedia of Chemical Technology, vol. 8, $4^{th}$ Ed. (1992), pp. 223-237.
Marger et al., "Phase Change Rapid Prototyping With Aqueous Inks," NIP23 and Digital Fabrication 2007 Conference Proceedings, pp. 908-911.
Canadian Office Action dated May 22, 2012 from Canadian Patent Application No. 2,737,570.

* cited by examiner

*Primary Examiner* — Ling Choi
*Assistant Examiner* — Jessica E Whiteley
(74) *Attorney, Agent, or Firm* — Pillsbury Winthrop Shaw Pittman LLP

(57) ABSTRACT

Curable, phase-change compositions and inks used for printing three-dimensional objects including a curable monomer, a photoinitiator, a wax and a gellant, where the composition of the cured formulation has a room temperature modulus of from about 0.01 to about 5 Gpa. The curable monomer includes acrylic monomer, polybutadiene adducted with maleic anhydride, aliphatic urethane acrylate, polyester acrylate, 3-acryloxypropyltrimethoxysilane, or acryloxypropyl t-structured siloxane.

9 Claims, No Drawings

US 9,012,527 B2

CURABLE COMPOSITIONS FOR THREE-DIMENSIONAL PRINTING

RELATED APPLICATIONS

This application is a divisional application of U.S. patent application Ser. No. 12/765,309, now U.S. Pat. No. 8,603,612. U.S. patent application Ser. No. 12/204,307, filed Sep. 4, 2008, the disclosure of which is hereby incorporated by reference in its entirety, describes a method of fabricating a three-dimensional object comprising depositing a first amount of an ultraviolet curable phase change ink composition comprising an optional colorant and a phase change ink vehicle comprising a radiation curable monomer or prepolymer, a photoinitiator, a reactive wax, and a gellant upon a print region surface, successively depositing additional amounts of the ultraviolet curable phase change ink composition to create a three-dimensional object, and curing the ultraviolet curable phase change ink composition.

BACKGROUND

Analog manufacturing is moving towards, and is expected to one day be consumed, by digital manufacturing. This shift is customer driven and arises from a desire for more customized products, on-demand delivery, and other market factors that support the move towards a less expensive alternative to traditional manufacturing.

Digital fabrication encompasses a range of technologies, including ink jet. Ink jet has the advantage of being a non-contact, additive process (as opposed to subtractive processes like computer numerical control machining) with the built-in ability to deliver metered amounts of various fluids to a precise location in time and space. Moreover, digital ink jet fabrication has a wide materials scope and may be used to print a variety of materials, such as UV-curable resins and molten thermoplastic polymers.

Current technologies for three-dimensional printing include stereolithography and rapid prototyping. While suitable for some purposes, these technologies each have their own limitations. Stereolithography is a costly process with machines often costing in excess of $250,000. The polymer materials employed are also extremely expensive, with a common stereolithography photopolymer costing about $800 per gallon. Rapid prototyping systems typically use a fused deposition method wherein molten acrylonitrile-butadiene-styrene (ABS) polymer is deposited. The extremely rapid solidification of the ABS manifests in ridges that form on the finished object. Post-printing treatment of the prototype (such as sanding or polishing) is required to render a smooth object.

The concept of "freezing" or phase-change has been described for three-dimensional printing using aqueous inks on a chilled (that is, sub-zero temperature) substrate. See D. Mager et al., "Phase Change Rapid Prototyping With Aqueous Inks," NIP 23 and Digital Fabrication 2007 Conference Proceedings, pages 908-911, which is hereby incorporated by reference herein. Ink jet fabrication using wax based materials has been described but is disadvantaged by the fact that the resulting primary structures are neither robust nor permanent.

Currently, many three-dimensional printing technologies use rigid materials. For example, fused deposition methods use molten thermosetting resins, such as ABS plastic and hard acrylates. Moreover, many current technologies use ultra-thin jetted layers (for example, 0.6 mm) that must be cured after each deposition step. As such, there remains a need for a wider selection of materials having a variety of different properties, particularly a wider range of room temperature modulus, thereby providing rigid and rubbery objects, and materials that reduce the number of curing steps between deposition steps, thereby providing faster object construction and lower energy requirements.

SUMMARY

The present disclosure addresses these and other needs, by providing an expanded materials set which allows ink jet digital fabrication of objects having a range of room temperature modulus, such as between about 0.01 to about 5 GPa. The present disclosure also provides printed layers having a thickness of about 1-6 mm.

In embodiments, a composition used for three-dimensional printing comprises a radiation curable monomer, a photoinitiator, a wax and a gellant, where the composition of the printed and cured object has a room temperature modulus of less than about 0.01 to about 5 GPa.

A three-dimensional object comprises a first component having a composition comprising a first radiation curable monomer, and at least a second component having a composition comprising a second radiation curable monomer, where each component has a room temperature modulus in its cured form of from about 0.01 to about 5 GPa.

A phase-change ink set comprises a first ink composition, at least one other ink composition, wherein each cured ink composition has a different room temperature modulus of from about 0.01 to about 5 GPa.

A method of printing a three-dimensional object comprises depositing upon a print region surface an initial amount of a composition comprising a monomer, a photoinitiator, a wax and a gellant, successively depositing amounts of the composition to create a three-dimensional object, and curing the composition, where the cured composition has a room temperature modulus of from about 0.01 to about 5 GPa, thereby obtaining the three-dimensional object.

EMBODIMENTS

In embodiments, radiation curable phase-change inks used as materials for fabricating three-dimensional objects may have a room temperature modulus of from about 0.01 to about 5 GPa. These inks may comprise a radiation curable monomer, a photoinitiator, a reactive wax and a gellant. Pigments or other functional particles may be optionally included depending on the desired application. In further embodiments, disclosed are methods of making three-dimensional objects using such radiation curable phase-change inks.

As referred to in this disclosure, the room temperature modulus values refer to the room temperature modulus values of ink compositions after the compositions are polymerized and cured. Furthermore, a monomer refers to a monomer that is reactive and curable.

Monomer

As described above, the ink compositions may comprise a monomer. Suitable monomers include radiation curable monomer compounds, such as acrylate and methacrylate monomer compounds, which are suitable for use as phase-change ink carriers. Examples of monomers include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl(meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

In embodiments, the monomer may be selected from the group consisting of acrylic monomer, polybutadiene adducted with maleic anhydride, aliphatic urethane acrylate, polyester acrylate, 3-acryloxypropyltrimethoxysilane, and acryloxypropyl t-structured siloxane, or a mixture thereof. Other exemplary monomers include any monomer listed in Sartomer's product listing under "monofunctional monomers" (available at http://www.sartomer.com/prodsubgroup.asp?plid=1&sgid=2).

In embodiments, the composition may comprise the monomer in an amount of from about 15 to about 60% by weight of the composition, such as from about 20 to about 55% or from about 25 to about 50% by weight. In other embodiments, the composition may comprise the monomer in an amount of from about 15 to about 35% by weight of the composition or from about 40 to about 60% by weight of the composition.

In embodiments, the monomers described above may impart on the cured inks a room temperature modulus of from about 0.01 to about 5 GPa, such as from about 0.51 to about 4.5 GPa, from about 1.01 to about 4 GPa, from about 1.51 to about 3.5 GPa, or from about 2.01 to about 3 GPa. The room temperature modulus may also be from about 0.01 to about 1.7 GPa, from about 1.7 to about 3.4 GPa, or from about 3.4 to about 5 GPa.

In embodiments, a phase-change ink set may comprise different ink compositions where each ink composition imparts a different room temperature modulus range. In embodiments, the phase-change ink set may comprise a first ink composition and at least one other ink composition where each ink composition has a different room temperature modulus between from about 0.01 to about 5 GPa. For example, the phase-change ink set may comprise a first ink composition having a room temperature modulus of from about 0.01 to about 2.5 GPa, such as from about 0.01 to about 1.25 or from about 1.25 to about 2.5 GPa, and a second ink composition having a room temperature modulus of from about 2.5 to about 5 GPa, such as from about 2.5 to about 3.75 GPa or from about 3.75 to about 5 GPa.

The phase-change ink set may comprise a first ink composition having a room temperature modulus of from about 0.01 to about 1.7 GPa, such as from about 0.01 to about 0.9 or from about 0.9 to about 1.7, a second ink composition having a room temperature modulus of from about 1.7 to about 3.4 GPa, such as from about 1.7 to about 2.6 GPa or from about 2.6 to about 3.4 GPa, and a third ink composition having a room temperature modulus of from about 3.4 to about 5 GPa, such as from about 3.4 to about 4.3 or from about 4.3 to about 5 GPa.

In embodiments, the phase-change ink set may comprise from 2 to 10 different ink compositions, such as from 3 to 8, or 4 to 6, or 2 to 4, or 5 to 9 different ink compositions.

In embodiments, multifunctional acrylate and methacrylate monomers and oligomers may be included in the phase-change ink carrier as reactive diluents and as materials that can increase the crosslink density of the cured image, thereby enhancing the toughness of the cured images. Different monomer and oligomers may also be added to tune the plasticity or elasticity of the cured objects. Examples of suitable multifunctional acrylate and methacrylate monomers and oligomers include pentaerythritol tetraacrylate, pentaerythritol tetramethacrylate, 1,2-ethylene glycol diacrylate, 1,2-ethylene glycol dimethacrylate, 1,6-hexanediol diacrylate (available from Sartomer Co. Inc. as SR238), 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), neopentyl glycol diacrylate esters (available from Sartomer Co. Inc. as SR247), 1,4-butanediol diacrylate (BDDA, available from Sartomer Co. Inc. as SR213), tripropylene glycol diacrylate, dipropylene glycol diacrylate, dioxane glycol diacrylate (DOGDA, available from Sartomer Co. In. as CD536), amine modified polyether acrylates (available as PO 83 F, LR 8869, and/or LR 8889 (all available from BASF Corporation), trimethylolpropane triacrylate, ethoxylated trimethylolpropane triacrylate (available from Sartomer Co. Inc. as SR454), glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof.

The reactive diluent may be added in any desired or effective amount. For example, the reactive diluent may be added in an amount from about 1 to about 80% by weight of the carrier, such as about 10 to about 70%, or about 30 to about 50%, by weight of the carrier.

In embodiments, the curable monomer may be added to the ink composition with tackifiers, such as hydrocarbon tackifiers. Other exemplary tackifiers include FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC 2300, NEVIAC 100, and NEVRAC 80 (commercially available from Neville Chemical Company), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, at least about 10%, or no more than about 50%.

Photoinitiator

In embodiments, the phase-change inks disclosed herein may comprise any suitable photoinitiator. A photoinitiator that absorbs radiation, for example UV light radiation, to initiate curing of the curable components of the ink may be used. Ink compositions containing acrylate groups or inks comprised of polyamides may include photoinitiators such as benzophenones, benzoin ethers, benzil ketals, α-hydroxyalkylphenones, α-alkoxyalkylphenones, α-aminoalkylphenones, and acylphosphine photoinitiators sold under the trade designations of IRGACURE and DAROCUR (available from BASF). Examples of suitable photoinitiators include 2,4,6-trimethylbenzoyldiphenylphosphine oxide (available as LUCIRIN TPO from BASF); 2,4,6-trimethylbenzoylethoxyphenylphosphine oxide (available as LUCIRIN TPO-L from BASF); bis(2,4,6-trimethylbenzoyl)-phenyl-phosphine oxide (available as IRGACURE 819 from BASF) and other acyl phosphines; 2-methyl-1-(4-methylthio)phenyl-2-(4-morphorlinyl)-1-propanone (available as IRGACURE 907 from BASF) and 1-(4-(2-hydroxyethoxy)phenyl)-2-hydroxy-2-methylpropan-1-one (available as IRGACURE 2959 from BASF); 2-benzyl 2-dimethylamino 1-(4-morpholinophenyl) butanone-1 (available as IRGACURE 369 from BASF); 2-hydroxy-1-(4-(4-(2-hydroxy-2-methylpropionyl)-benzyl)-phenyl)-2-methylpropan-1-one (available as IRGACURE 127 from BASF); 2-dimethylamino-2-(4-methylbenzyl)-1-(4-morpholin-4-ylphenyl)-butanone (available as IRGACURE 379 from BASF); titanocenes; isopropylthioxanthone (available as Darocur ITX from BASF); 1-hydroxy-cyclohexylphenylketone; benzophenone; 2,4,6-trimethylbenzophenone; 4-methylbenzophenone; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof. Amine synergists may also be used. Amine synergists are co-initiators that donate a hydrogen atom to a photoinitiator and thereby form a radical species that initiates polymerization (amine synergists can also consume oxygen dissolved in the ink; as oxygen inhibits free-radical polymerization its consumption increases the speed of polymerization). Exemplary amine synergists include, for example, ethyl-4-dimethylaminobenzoate and 2-ethylhexyl-4-dimethylaminobenzoate. This list is not exhaustive, and any known photoinitiator that initiates free-radical reaction upon exposure to a desired wavelength of radiation such as UV light may be used without limitation.

Optionally, the phase-change inks may also contain an amine synergist, which are co-initiators that can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include ethyl-4-dimethylaminobenzoate, 2-ethylhexyl-4-dimethylaminobenzoate, and the like, as well as mixtures thereof.

The photoinitiator may absorb radiation of about 200 to about 420 nm wavelengths to initiate cure, although use of initiators that absorb at longer wavelengths, such as the titanocenes that may absorb up to 560 nm, may also be used without restriction.

The total amount of initiator included in the ink composition may be from, for example, about 0.5 to about 15 wt % by weight of the ink composition, such as from about 1 to about 10 wt %.

Reactive Wax

The phase-change inks disclosed herein may comprise a reactive wax. In embodiments, the reactive wax may comprise a curable wax component that is miscible with the other components and that will polymerize with the curable monomer to form a polymer. Inclusion of the wax promotes an increase in viscosity of the ink as it cools from the jetting temperature.

Exemplary waxes include those that are functionalized with curable groups. In embodiments, the curable groups may include, acrylate, methacrylate, alkene, allylic ether, epoxide and oxetane. These waxes may be synthesized by the reaction of a wax equipped with a transformable functional group, such as carboxylic acid or hydroxyl.

Suitable examples of hydroxyl-terminated polyethylene waxes that may be functionalized with a curable group include, mixtures of carbon chains with the structure $CH_3$—$(CH_2)_n$—$CH_2OH$, where there is a mixture of chain lengths, n, where the average chain length is, in embodiments, in the range of about 16 to about 50, and linear low molecular weight polyethylene, of similar average chain length. Suitable examples of such waxes include, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

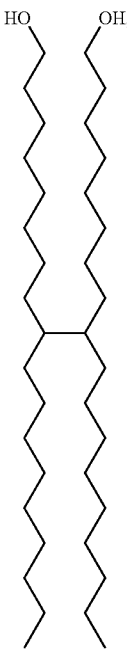

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols may be reacted with carboxylic acids equipped with UV curable moieties to form reactive esters. Examples of these acids include acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—$COOH$, where there is a mixture of chain lengths, n, where the average chain length is in selected embodiments in the range of about 16 to about 50, and linear low molecular weight polyethylene, of similar average chain length. Suitable examples of such waxes include UNICID® 350, UNICID® 425, UNICID® 550 and UNICID® 700 with Mn equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

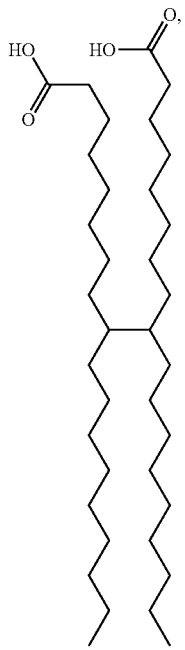 [SMILES: CCCCCCCCCC(CCCCCCCC(=O)O)C(CCCCCCCCC)CCCCCCCC(=O)O]

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) may also be used. These carboxylic acids may be reacted with alcohols equipped with UV curable moieties to form reactive esters. Examples of these alcohols include 2-allyloxyethanol from Sigma-Aldrich Co.;

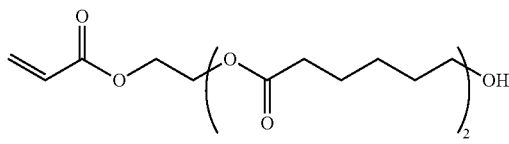

SR495B from Sartomer Company, Inc.;

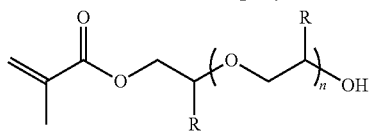

CD572 (R═H, n=10) and SR604 (R═Me, n=4) from Sartomer Company, Inc.

In embodiments, the optional curable wax is included in the ink in an amount of from, for example, about 1 to about 25% by weight of the ink, such as from about 2 to about 20% by weight of the ink, or from about 2.5 to about 15% by weight of the ink.

The curable monomer or prepolymer and curable wax together may form more than about 50% by weight of the ink, or at least 70% by weight of the ink, or at least 80% by weight of the ink.

Gellant

The phase-change inks disclosed herein may comprise any suitable gellant. The gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like; which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink composition. Mixtures of one or more gellants may be used to effect the phase-change transition.

The phase change nature of the gellant may be used to cause a rapid viscosity increase in the jetted ink composition following jetting of the ink to the substrate. In particular, jetted ink droplets may be pinned into position on a receiving substrate with a cooler temperature than the ink-jetting temperature of the ink composition through the action of a phase-change transition.

The temperature at which the ink composition forms the gel state is any temperature below the jetting temperature of the ink composition, for example any temperature that is about 10° C. or more below the jetting temperature of the ink composition. There is a rapid and large increase in ink viscosity upon cooling from the jetting temperature at which the ink composition is in a liquid state, to the gel transition temperature, at which the ink composition converts to the gel state. The ink composition of some embodiments may show at least a $10^{2.5}$-fold increase in viscosity.

Suitable gellants may gel the monomers/oligomers in the ink vehicle quickly and reversibly, and demonstrate a narrow phase-change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. In some embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Suitable gellants include a curable gellant comprised of a curable amide, a curable polyamide-epoxy acrylate component and a polyamide component; a curable composite gellant comprised of a curable epoxy resin and a polyamide resin;

mixtures thereof and the like, as disclosed in U.S. application Ser. No. 12/474,946, the disclosure of which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants may be amphiphilic in nature to improve wetting when the composition is used over a substrate having silicone or other oil thereon. "Amphiphilic" refers to molecules that have both polar and non-polar parts of the molecule. For example, the gellants may have long non-polar hydrocarbon chains and polar amide linkages.

Amide gellants include those described in U.S. Patent Application Publication No. 2008/0122914 and U.S. Pat. Nos. 7,276,614 and 7,279,587, the entire disclosures of which are incorporated herein by reference.

The amide gellant may be a compound of the following formula (I):

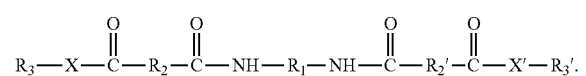

In formula (I), $R_1$ may be:
(i) an alkylene group (wherein an alkylene group is a divalent aliphatic group or alkyl group, including linear and branched, saturated and unsaturated, cyclic and acyclic, and substituted and unsubstituted alkylene groups; and wherein heteroatoms, such as oxygen, nitrogen, sulfur, silicon, phosphorus, boron, and the like either may or may not be present in the alkylene group) having from about 1 to about 12 carbon atoms, such as from about 1 to about 8, or from about 1 to about 5 carbon atoms;
(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 to about 15 carbon atoms, such as from about 3 to about 10, or from about 5 to about 8 carbon atoms;
(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 to about 32 carbon atoms, such as from about 6 to about 22, or from about 6 to about 12 carbon atoms; or
(iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 to about 32 carbon atoms, such as from about 6 to about 22, or from about 7 to about 15 carbon atoms.

Unless otherwise specified, the substituents on the substituted alkyl, aryl, alkylene, arylene, arylalkylene, and alkylarylene groups disclosed above and hereinafter may be selected from halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like. Optionally, two or more substituents may be joined together to form a ring.

In formula (I), $R_2$ and $R_2'$ each, independently of the other, may be:
(i) alkylene groups having from about 1 to about 54 carbon atoms, such as from about 1 to about 48, or from about 1 to about 36 carbon atoms;
(ii) arylene groups having from about 5 to about 15 carbon atoms, such as from about 5 to about 13, or from about 5 to about 10 carbon atoms;
(iii) arylalkylene groups having from about 6 to about 32 carbon atoms, such as from about 7 to about 33, or from about 8 to about 15 carbon atoms; or
(iv) alkylarylene groups having from about 6 to about 32 carbon atoms, such as from about 6 to about 22, or from about 7 to about 15 carbon atoms.

In formula (I), $R_3$ and $R_3'$ each, independently of the other, may be either:
(a) photoinitiating groups, such as groups derived from 1-(4-(2-hydroxyethoxy)phenyl)-2-hydroxy-2-methylpropan-1-one, of the formula (II):

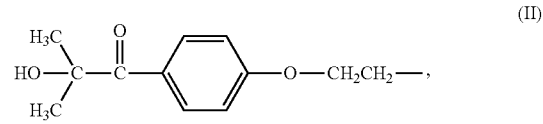

groups derived from 1-hydroxycyclohexylphenylketone, of the formula (III):

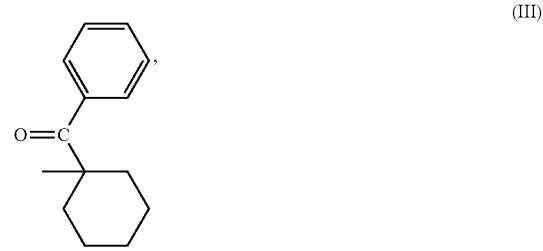

groups derived from 2-hydroxy-2-methyl-1-phenylpropan-1-one, of the formula (IV):

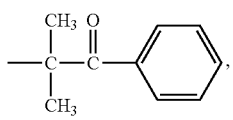

groups derived from N,N-dimethylethanolamine or N,N-dimethylethylenediamine, of the formula (V):

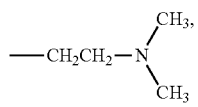

or the like; or
  (b) a group which is:
    (i) an alkyl group (wherein an alkyl group includes linear and branched, cyclic and acyclic, and substituted and unsubstituted alkyl groups, and wherein hetero atoms such as oxygen, nitrogen, sulfur, silicon, phosphorus, boron, and the like, may optionally be present in the alkyl group) having from about 2 to about 100 carbon atoms, such as from about 3 to about 60, or from about 4 to about 30 carbon atoms;
    (ii) an aryl group (wherein an aryl group includes substituted and unsubstituted aryl groups) having from about 5 to about 100 carbon atoms, such as from about 5 to about 60, or from about 6 to about 30 carbon atoms, such as phenyl or the like;
    (iii) an arylalkyl group having from about 5 to about 100 carbon atoms, such as from about 5 to about 60, or from about 6 to about 30 carbon atoms, such as benzyl or the like; or
    (iv) an alkylaryl group having from about 5 to about 100 carbon atoms, such as from about 5 to about 60, or from about 6 to about 30 carbon atoms, such as tolyl or the like.

In addition, in formula (I), X and X' each, independently of the other, may be an oxygen atom or a group of the formula —NR$_4$—, wherein R$_4$ is:
  (i) a hydrogen atom;
  (ii) an alkyl group having from about 5 to about 100 carbon atoms, such as from about 5 to about 60 or from about 6 to about 30 carbon atoms:
  (iii) an aryl group having from about 5 to about 100 carbon atoms, such as from about 5 to about 60 or from about 6 to about 30 carbon atoms;
  (iv) an arylalkyl group having from about 5 to about 100 carbon atoms, such as from about 5 to about 60 or from about 6 to about 30 carbon atoms; or
  (v) an alkylaryl group having from about 5 to about 100 carbon atoms, such as from about 5 to about 60 or from about 6 to about 30 carbon atoms.

Further details may be found, for example, in U.S. Pat. Nos. 7,279,587 and 7,276,614.

The gellant may comprise one of or a mixture of formulas (VI), (VII), or (VIII):

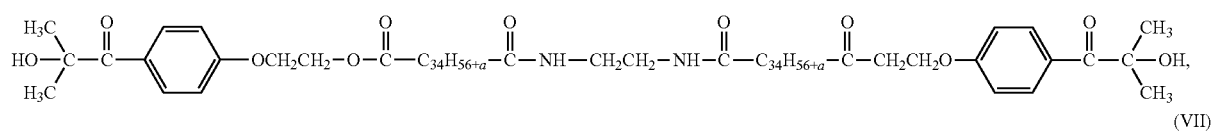

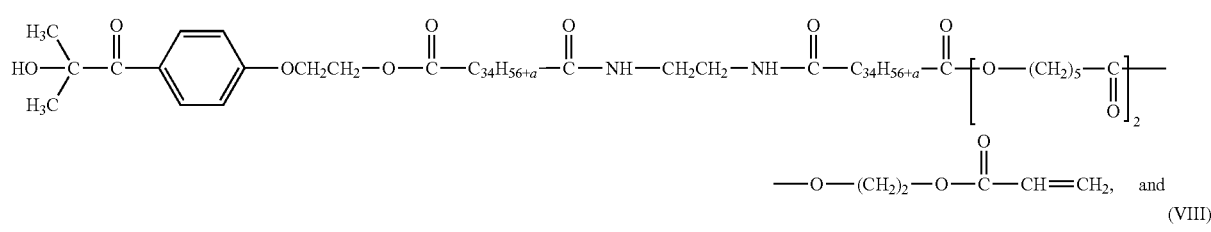

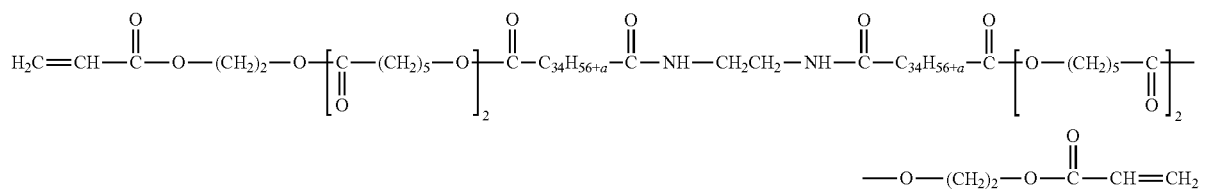

where —C$_{34}$H$_{56+a}$— represents a branched alkylene group that may include unsaturations and cyclic groups, and the variable "a" is an integer from 0-12.

The gellant may be a composite gellant, for example, a gellant comprised of a curable epoxy resin and a polyamide resin. Suitable composite gellants are described in commonly assigned U.S. Pat. No. 7,563,489, the entire disclosure of which is incorporated herein by reference.

The epoxy resin component in the composite gellant may be any suitable epoxy group-containing material. The epoxy group containing component includes the diglycidyl ethers of either polyphenol-based epoxy resin or a polyol-based epoxy resin, or mixtures thereof. That is, the epoxy resin has two epoxy functional groups that are located at the terminal ends of the molecule. The polyphenol-based epoxy resin is a bisphenol A-co-epichlorohydrin resin with not more than two glycidyl ether terminal groups. The polyol-based epoxy resin may be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp., such as DER 383, or the dipropyleneglycol-based resins from Dow Chemical Corp., such as DER 736. Other sources of epoxy-based materials originating from natural sources may be used, such as epoxidized triglyceride fatty esters of vegetable or animal origins, for example epoxidized linseed oil, rapeseed oil, and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether, and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. The polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid, and the like, and a polyamine, such as a diamine (for example, alkylenediamines such as DYTEK series diamines, ethylenediamine, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides (available from Cognis Corporation (formerly Henkel Corp.)); in particular VERSAMID 335, VERSAMID 338, VERSAMID 795, and VERSAMID 963, all of which have low molecular weights and low amine numbers; and the SYLVAGEL polyamide resins (available from Arizona Chemical Company), and variants thereof including polyether-polyamide resins may be employed. The composition of the SYLVAGEL resins obtained from Arizona Chemical Company are described as polyalkyleneoxydiamine polyamides with the general formula (IX),

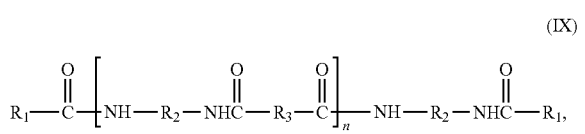

(IX)

wherein $R_1$ is an alkyl group having at least seventeen carbon atoms, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as those disclosed in commonly assigned U.S. Pat. No. 7,632,546, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation-curable via free-radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as from about 1 to about 50 wt % of the ink, or from about 2 to about 20 wt %, or from about 3 to about 10 wt %.

The gellant may comprise a compound of the formula (X):

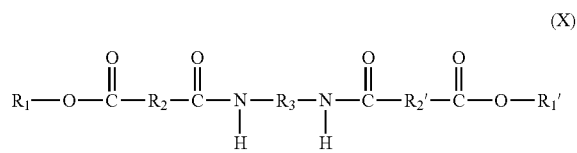

(X)

where:

$R_1$ and $R_1'$ are the same and are selected from the following non-reactive aromatic groups:

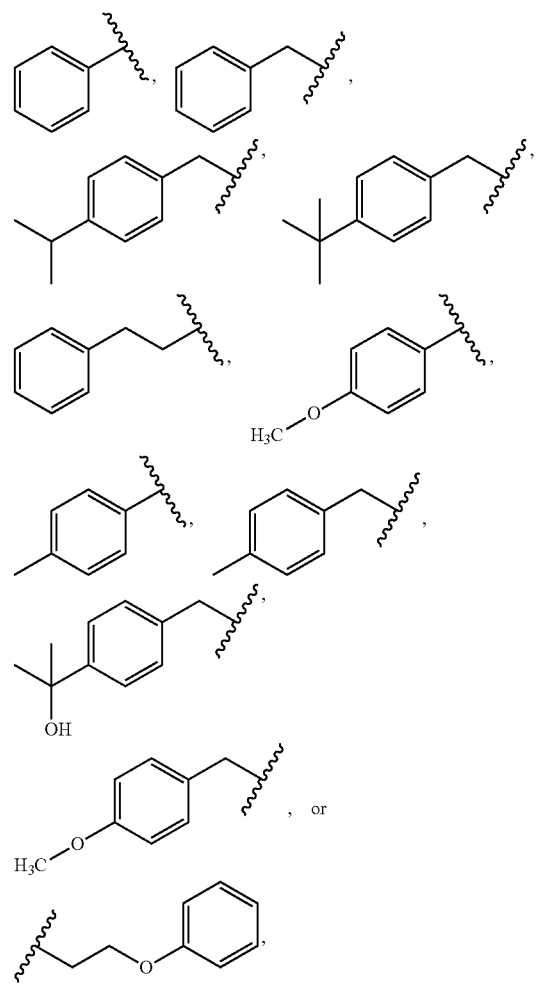

wherein ～ represents the point of attachment of the $R_1$ and $R_1'$ group.

In some embodiments, $R_1$ and $R_1'$ are the same and are selected from the formulas:

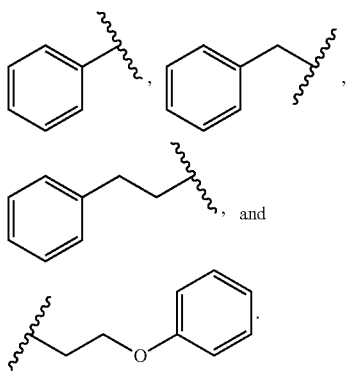

In one specific embodiment, $R_1$ and $R_1'$ are each of the formula

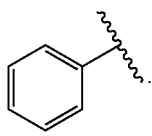

In another specific embodiment, $R_1$ and $R_1'$ are each of the formula

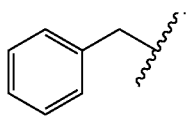 [SMILES: "." ; *Cc1ccccc1]

In yet another specific embodiment, $R_1$ and $R_1'$ are each of the formula

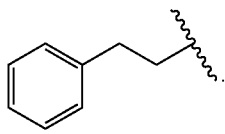 [SMILES: *CCc1ccccc1 ; "."]

In still another specific embodiment, $R_1$ and $R_1'$ are each of the formula

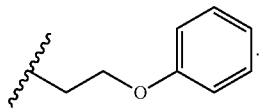 [SMILES: *CCOc1ccccc1]

$R_2$ and $R_2'$ are the same or different, and are each independently selected from:

(i) alkylene groups having from about 2 to about 100 carbon atoms, such as at least about 2, 4, 6, 8, 10, 12, 14, 16, 18, 20, 22, 24, 26, 28, 30, 32, 34, or 36 carbon atoms, or no more than about 100, or no more than about 60, or no more than about 50 carbon atoms, or such as having about 36 carbon atoms, although the numbers can be outside of these ranges;

(ii) arylene groups having from about 5 to about 100 carbon atoms, such as, for example, at least about 5 or 6 carbon atoms, or no more than about 100, or no more than about 60, or no more than about 50 carbon atoms, although the numbers can be outside of these ranges;

(iii) arylalkylene groups having from about 6 to about 100 carbon atoms, such as, for example, at least about 6 or 7 carbon atoms, or nor more than about 100, or no more than about 60, or no more than about 50 carbon atoms, although the numbers can be outside of these ranges; and (iv) alkylarylene groups having from about 6 to about 100 carbon atoms, such as, for example, at least 6 or 7 carbon atoms, or no more than about 100, or no more than about 60, or no more than about 50 carbon atoms, although the numbers can be outside of these ranges.

In some embodiments, $R_2$ and $R_2'$ are both alkylene groups, which can be linear or branched, saturated or unsaturated, cyclic or acyclic, and substituted alkylene groups, and hetero atoms may optionally be present in the alkylene group. In some other embodiments, $R_2$ and $R_2'$ are both saturated alkylene groups. In other embodiments, $R_2$ and $R_2'$ are both unsubstituted alkylene groups. In some embodiments, $R_2$ and $R_2'$ are each of the formula

and are branched alkylene groups that may include unsaturations and cyclic groups, where a is an integer of 0, 1, 2, 3, 4, 5, 6, 7, 8, 9, 10, 11, or 12. In some other embodiments, $R_2$ and $R_2'$ include isomers of the formula

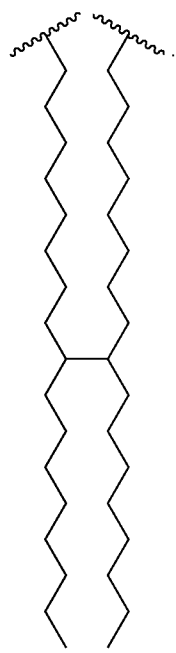 [SMILES: *CCCCCCCCC(CCCCCCCC)C(CCCCCCCC)CCCCCCCC* ; "."]

$R_3$ is:
(i) an alkylene group having from about 2 to about 80 carbon atoms, such as, for example, at least about 2 carbon atoms, or no more than about 80, 60, 50, or 36 carbon atoms, although the numbers of carbon atoms can be outside of these ranges;
(ii) an arylene group having from about 2 to about 50 carbon atoms, such as, for example, about 2 carbon atoms, or having no more than about 5 or 6 carbon atoms, or no more than about 50, 25, or 18 carbon atoms, although the numbers of carbon atoms can be outside of these ranges;
(iii) an arylalkylene group having from about 6 to about 50 carbon atoms such as, for example, at least about 6 or 7 carbon atoms, or no more than about 50, 36, or 18 carbon atoms, although the numbers of carbon atoms can be outside of these ranges; or
(iv) an alkylarylene group having from about 6 to about 50 carbon atoms, such as, for example, at least about 6 or 7 carbon atoms, or no more than about 50, 36, or 18 carbon atoms, although the numbers of carbon atoms can be outside of these ranges.

In some embodiments, $R_3$ is a linear or branched alkylene group, which can be saturated or unsaturated, substituted or unsubstituted alkylene groups, and where hetero atoms may optionally be present in the alkylene group. In a specific embodiment, $R_3$ is an ethylene group $$—CH_2CH_2—.$$

In embodiments where $R_1$ and $R_1'$ are a single species end-capping both ends of the gellant compound, a single gellant product is provided, rather than a mixture, thereby eliminating the need for complex post-reaction purification and processing. The gellant composition functionalized with identical aromatic end-cap molecules provides enhanced spectral transmission and gelation properties, such as reduced ultraviolet absorbance, higher thermal stability, and higher ultimate viscosity over prior gellant compounds.

Aromatic end-capped gellant compounds have reduced ultraviolet absorbance that enables more efficient ultraviolet cure of a phase change ink prepared with the present gellants. In certain embodiments, the compounds herein provide an absorbance of from about 0 to about 0.8, or from about 0 to about 0.7, or from about 0 to about 0.6 at a wavelength of from about 230 to about 400 nanometers.

In embodiments where $R_1$ and $R_1'$ are the same non-reactive end-cap molecule, the resultant gellant compound exhibits high thermal stability. With respect to thermal stability, heating of a conventional gellant overnight in an oven at 85° C. yields a product that is incompletely soluble in monomer. In embodiments herein, gellants with aromatic end-cap functionality are stable for at least about 8 weeks in an oven at 85° C. and the material is freely soluble in monomer. As used here, "stable" means that there is no crosslinking or decomposition of the gellant material, and it remains completely soluble in monomer. The use of a single end-cap species results in cleaner product synthesis with fewer side products.

In certain embodiments, the compounds herein provide a complex viscosity of from about $10^4$ centipoise (cps) to about $10^8$ cps, or from about $10^5$ cps to about $10^7$ cps, or from about $10^5$ cps to about $10^6$ cps at a temperature of from about 10 to about 50° C.

Specific gellant compounds may be of one of the following formulas:

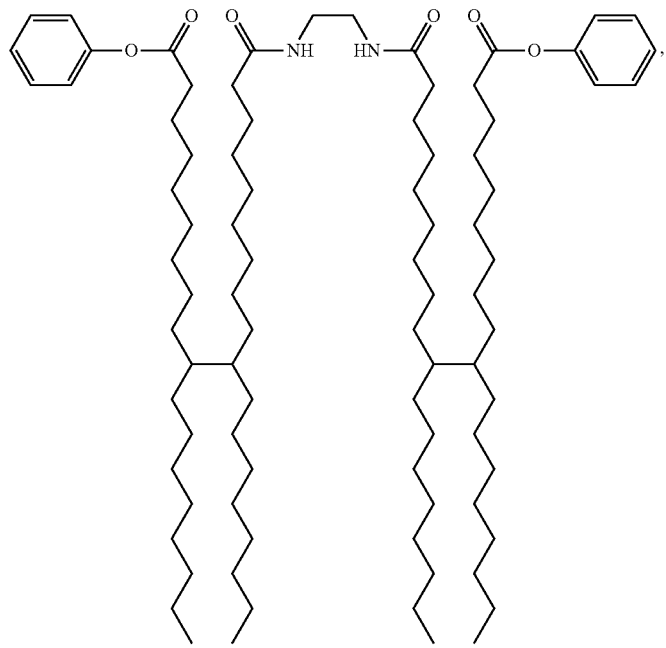

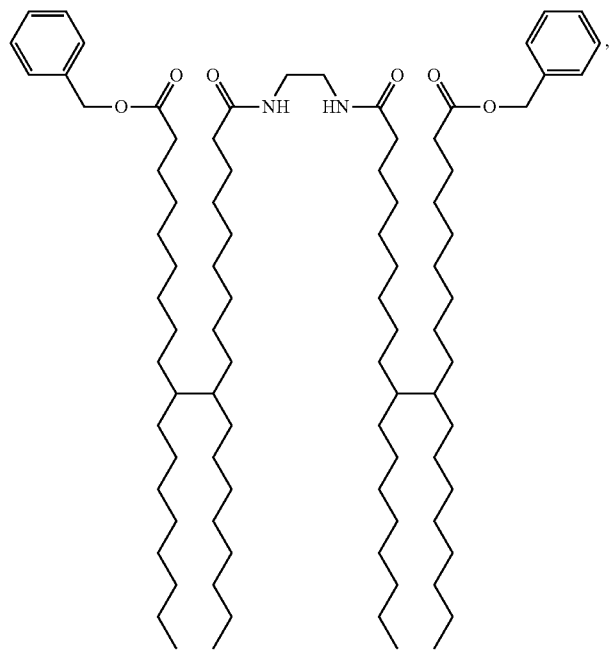
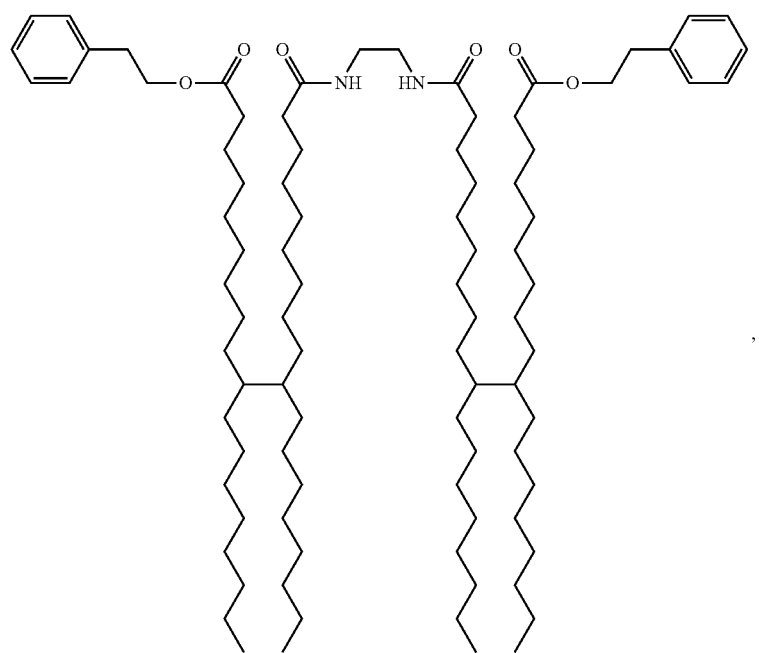
, and

-continued

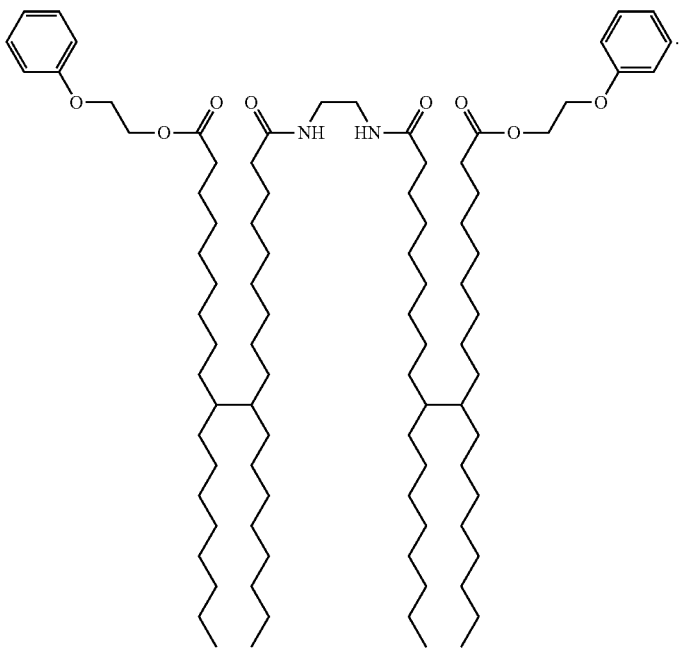

The gellant may comprise a compound of the formula (XI):

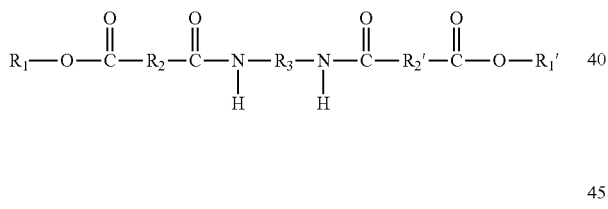

where $R_2$, $R_2'$ and $R_3$ are as described above for formula (X), and $R_1$ and $R_1'$ can be the same or different, and each, independently of the other, is:
  (i) an alkyl group having a least one ethylenic unsaturation therein and having at least about 2, 3, or 4 carbon atoms, or no more than about 100, 60, or 30 carbon atoms, although the number of carbon atoms can be outside of these ranges;
  (ii) an arylalkyl group having at least one ethylenic unsaturation therein, and having from about 6 to about 100 carbon atoms, such as, for example, at least about 6 or 7 carbon atoms, or no more than about 100, 60, or 30 carbon atoms, although the number of carbon atoms can be outside of these ranges;
  (iii) an alkylaryl group having at least one ethylenic unsaturation therein, having about 6 to about 100 carbon atoms, such as at least about 6 or 7 carbon atoms, or not more than about 100, 60, or 30 carbon atoms, although the number of carbon atoms can be outside of these ranges, such as tolyl or the like; or
  (iv) a non-reactive aromatic group;

provided that at least one of $R_1$ and $R_1'$ is a non-reactive aromatic group, and provided that neither of $R_1$ or $R_1'$ is a photoinitiator group.

One of $R_1$ or $R_1'$ may be selected from the following formulas:

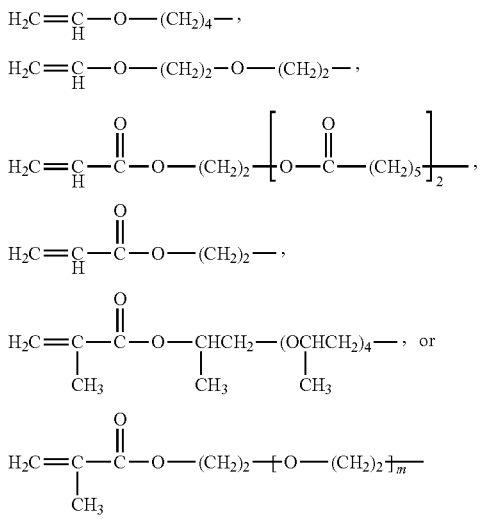

where "m" is an integer representing the number of repeating $(O-(CH_2)_2$ units. The variable "m" may be an integer from 1 to 10, or "m" may be an integer greater than 10.

Specific examples of suitable gellant compounds include the following formulas:

23
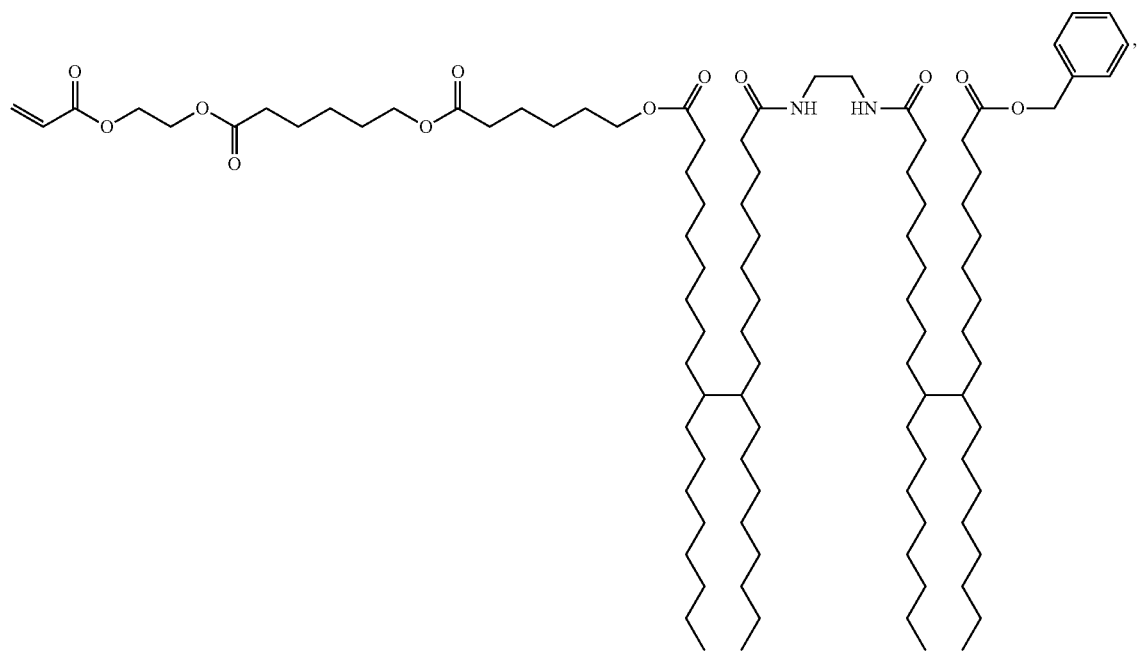
24
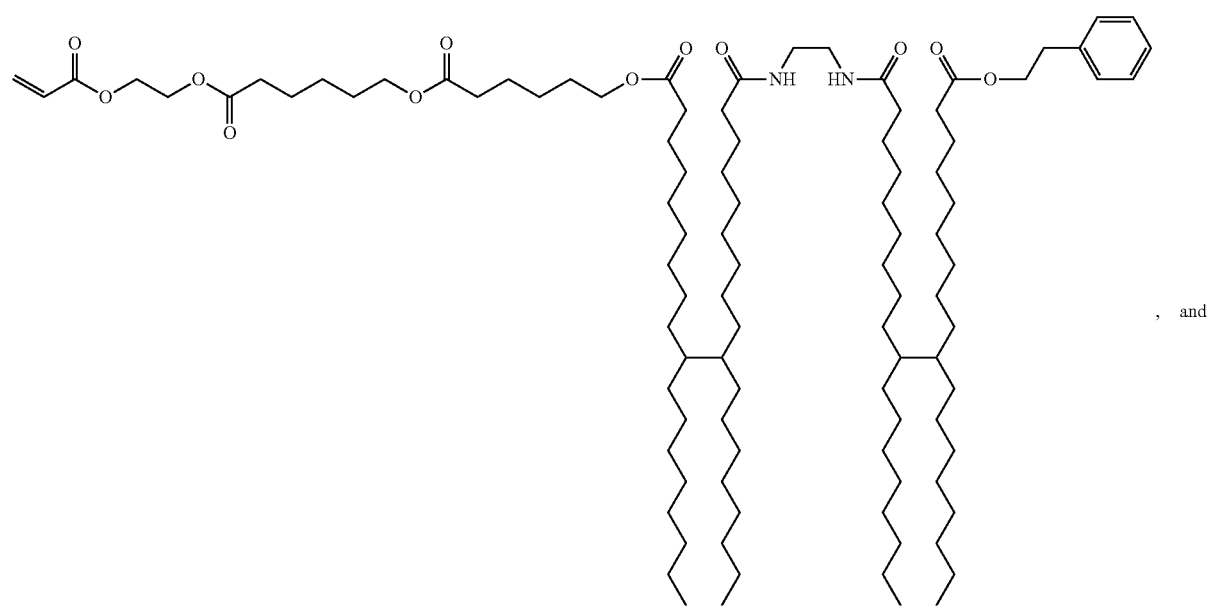
, and

-continued

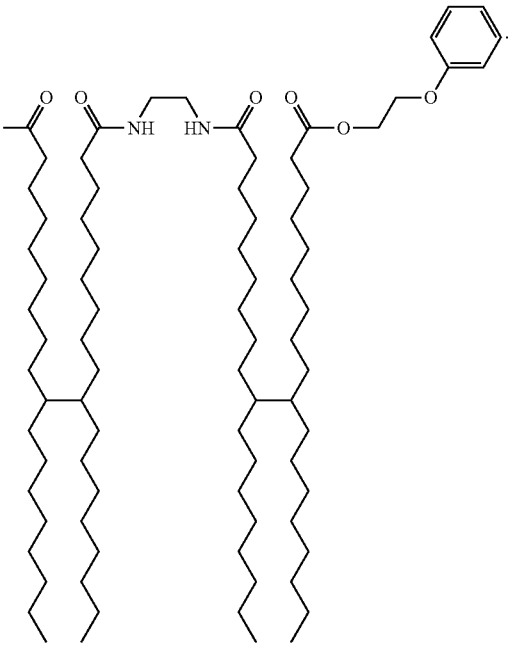

Compounds as disclosed herein can be prepared by any desired or effective method. For example, in one specific embodiment, about 2 molar equivalents of a diacid of the formula HOOC—$R_2$—COOH, and about one molar equivalent of a diamine of the formula

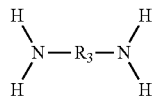

can be reacted by use of a coupling agent such as 1,3-dicyclohexylcarbodimide (DCC) in the present of a catalyst such as 4-dimethylaminopyridine (DMAP) in the presence of a solvent such as methylene chloride ($CH_2Cl_2$) at reduced temperatures followed by eventual warming to about room temperature to produce an organoamide intermediate.

The diacid and the diamine can be present in any desired or effective relative amounts, such as, for example, at least about 1.75 moles of diacid per every 1 mole of diamine, or at least about 2 moles of diacid per every 1 mole of diamine, or no more than about 2.5 moles of diacid per every 1 mole of diamine, or no more than about 2.3 moles of diacid per every 1 mole of diamine, or no more than about 2.1 moles of diacid per every 1 mole of diamine, although the relative amounts can be outside of these ranges.

In one embodiment, to the resulting reaction mixture containing the organoamide intermediate may be added about two molar equivalents of an identical aromatic end-cap molecule having the formula $R_1$—OH. In another embodiment, to the resulting reaction mixture containing the organoamide intermediate can be added about one molar equivalent of a first end-cap molecule which is an aromatic alcohol having the formula $R_1$—OH as described herein and about one molar equivalent of a second end-cap molecule which is an alkyl group having at least one ethylenic unsaturation, an arylalkyl group having at least one ethylenic unsaturation, or an alkylaryl group having at least one ethylenic unsaturation, as described herein. In a specific embodiment, the second end-cap molecule is caprolactone acrylate.

The organoamide intermediate and the aromatic alcohol may be present in any desired or effective relative amounts. For example, where $R_1$ and $R_{1'}$ are the same and comprise an aromatic alcohol, in one embodiment, at least about 1.75 moles of aromatic alcohol per every 1 mole of organoamide intermediate, or at least about 2 moles of aromatic alcohol per every 1 mole of organoamide intermediate, or at least about 2.25 moles of aromatic alcohol per every 1 mole of organoamide intermediate, or no more than about 3 moles of aromatic alcohol per every 1 mole of organoamide intermediate, or no more than about 2.75 moles of aromatic alcohol per every 1 mole of organoamide intermediate, or no more than about 2.5 moles of aromatic alcohol per every 1 mole of organoamide intermediate, although the relative amounts can be outside of these ranges. Where $R_1$ and $R_{1'}$ are two different species, the combined total amount of $R_1$ and $R_{1'}$ is, in embodiments, at least about 1.75, 2, 2.25 moles per every 1 mole of organoamide intermediate, or no more than about 2.75 or no more than about 2.5 moles (combined total of $R_1$ and $R_{1'}$), although the relative amounts can be outside of these ranges.

The ingredients may be mixed together in the sequence just described and a one pot reaction may be employed. For example, molten organoamide intermediate can be added to a 1 liter round bottomed flask equipped with a magnetic stir bar, followed by dichloromethane solvent with stirring until the organoamide intermediate is completely dissolved to form a clear, golden solution. A catalyst, such as DMAP, can be added, followed by a coupling agent, such as DCC.

Next, in one embodiment, a single species of end-cap molecule can be added to the reaction mixture containing the organoamide intermediate. Alternately, in another embodiment, a first species of end-cap molecule being an aromatic alcohol and a second species of end-cap molecule that is different from the aromatic alcohol can be added simultaneously to the reaction mixture.

The reaction mixture containing the organoamide intermediate or and the single end-cap component or the mixed end-cap components can be allowed to stir overnight at room temperature. The reaction contents can then be filtered to remove N,N-dicyclohexylurea (DCHU) by-product. The filtrate can be concentrated on a rotary evaporator resulting in a golden gel-like solid amide gellant. The solid residue can be dried in a vacuum oven, such as for about 2 hours at about 90° C., to remove residual solvent from the amide gellant.

Suitable coupling agents include: 1,3-dicyclohexylcarbodiimide (DCC) of the formula

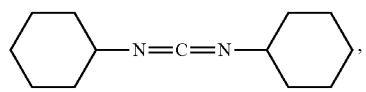 [SMILES: C(=NC1CCCCC1)=NC1CCCCC1 ; ","]

1-(3-(dimethylamino)propyl)-3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N',N'-bis(tetramethylene(uranium hexafluorophosphate (HBTU), bis(2-oxo-3-oxazolidinyl)phosphonic chloride (BOP—Cl), (1H-1,2,3-benzotriazol-1-yloxy)tris(pyrrolidino) phosphonium hexafluoro phosphate (PyBOP), and the like, and mixtures and combinations thereof.

The coupling agent and the diacid can be present in any desired or effective relative amounts. The coupling agent and the diacid may be present in an amount of at least about 1.8 moles of coupling agent per every 1 mole of diacid, or at least about 1.9 moles of coupling agent per every 1 mole of diacid, or at least about 2 moles of coupling agent per every 1 mole of diacid, or no more than about 2.75 moles of coupling agent per every 1 mole of diacid, or no more than about 2.5 moles of coupling agent per every 1 mole of diacid, or no more than about 2.2 moles of coupling agent per every 1 mole of diacid, although the relative amounts can be outside of these ranges. Examples of suitable catalysts include 4-dimethylaminopyridine (DMAP), of the formula

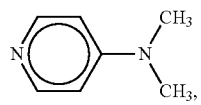

triethylamine, 1,8-diazabicyclo(4a.4.)undec-7-ene (DBU), and the like, and mixtures and combinations thereof.

The catalyst and the diacid are present in any desired or effective relative amounts. The catalyst and the diacid may be present in an amount of at least about 0.05 mole of catalyst per every 1 mole of diacid, or at least about 0.1 mole of catalyst per every 1 mole of diacid, or at least about 0.2 mole of catalyst per every 1 mole of diacid, or no more than about 1 mole of catalyst per every 1 mole of diacid, or no more than about 0.8 mole of catalyst per every 1 mole of diacid, or no more than about 0.5 mole of catalyst per every 1 mole of diacid, although the relative amounts can be outside of these ranges.

Any desired or effective solvent can be employed. Examples of suitable solvents include methylene chloride, tetrahydrofuran, methyl ethyl ketone, toluene, dimethyl formamide, diethyl ether, hexane, ethyl acetate, and the like, and mixtures and combinations thereof.

The solvent can be present in any desired or effective amount, such as in an amount of at least about 10 milliliters of solvent per milimole of diacid, or at least about 15 milliliters of solvent per milimole of diacid, or at least about 20 milliliters of solvent per milimole of diacid, or no more than about 50 milliliters of solvent per milimole of diacid, or no more than about 40 milliliters of solvent per milimole of diacid, or no more than about 30 milliliters of solvent per milimole of diacid, although the amount of solvent can be outside of these ranges.

The reaction between the diacid, the diamine, and the coupling agent can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting amine-terminated diamide intermediate and the additional diacid can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting organoamide intermediate and the aromatic alcohol can be carried out at any desired or effective temperature, such as from at least about 15° C. to no more than about 40° C., or from about 20° C. to about 35° C., or from about 25° C. to about 30° C., although the temperature can be outside of these ranges.

The reaction between the diacid and the diamine can be carried out for any desired or effective period of time, such as for about 2 to about 5 hours, although the period of time can be outside of this range.

The reaction between the organoamide intermediate and the aromatic alcohol, or mixture of aromatic alcohol and second end-cap molecule, can be carried out for any desired or effective period of time, such as from about 1.5 hours to about 12 hours, or from about 2 to about 5 hours, or from about 2.5 to about 4 hours, although the period of time can be outside of these ranges.

Subsequent to completion of the reaction, the product can be treated by any desired or effective method, such as filtration of any solid by-products or washing the solution with water depending on the coupling agent used. The solvent can be removed by rotary evaporation. If needed, the product can be purified by washing with acetone and dried in a vacuum oven.

Compounds as disclosed herein may also be prepared by first reacting about n+1 molar equivalents of a diacid of the formula HOOC—$R_2$—COOH and about n molar equivalent of a diamine of the formula

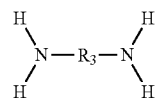

under neat conditions (i.e., in the absence of a solvent) at elevated temperatures while removing water from the reaction mixture to form an acid-terminated oligoamide of the formula

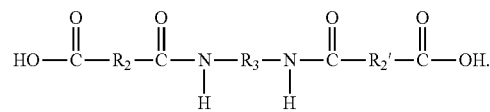

Thereafter, the acid-terminated oligoamide thus formed is reacted with about 2 molar equivalents of an aromatic alcohol of the formula $R_1$—OH or the acid-terminated organoamide thus formed is reacted with about 1 molar equivalent of an aromatic alcohol of the formula $R_1$—OH and about 1 molar equivalent of a second end-cap molecule which is an alkyl group having at least one ethylenic unsaturation, an arylalkyl group having at least one ethylenic unsaturation, or an alkylaryl group having at least one ethylenic unsaturation, as described herein, by use of a coupling agent such as DCC in the presence of a catalyst such as DMAP in the presence of a solvent such as methylene chloride at reduced temperatures.

The reaction proceeds as follows:

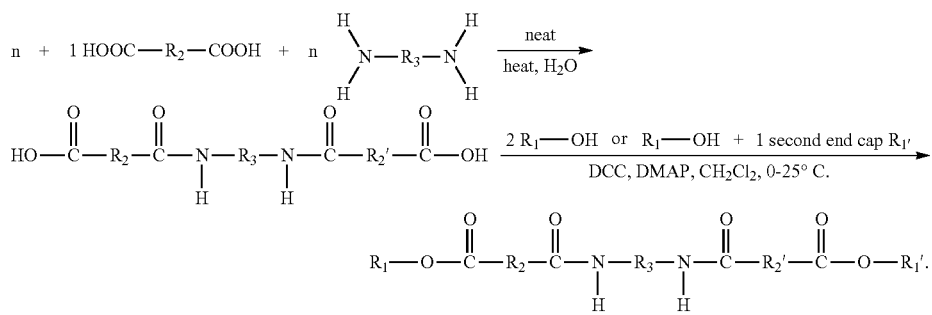

Water can be removed from the reaction mixture between the diacid and the diamine by any desired or effective method, such as by a Dean-Stark trap, molecular sieves, or other dryings agents, or the like. The reaction between the diacid and the diamine generally is run neat, that is, in the absence of a solvent. The reaction between the diacid and the diamine can be carried out at any desired effective temperature, such as from about 130° C. to about 180° C., or from about 140° C. to about 175° C., or from about 155° C. to about 165° C., although the temperature can be outside of these ranges. The reaction between the diacid and the diamine can be carried out for any desired or effective period of time, such as for about 2 to about 5 hours, or from about 2.5 to about 4.5 hours, or from about 3 to about 4 hours, although the period of time can be outside of these ranges.

Thereafter, the acid-terminated organoamide intermediate and the aromatic alcohol (or mixture of aromatic alcohol and second end-cap component) are reacted in the presence of a coupling agent and a catalyst. Suitable coupling agents include those described above, such as DCC. Suitable catalysts include those described above, such as DMAP.

The acid-terminated organoamide intermediate and the aromatic alcohol (or combined total of aromatic alcohol and second end-cap component) can be present in any desired or effective relative amounts, in embodiments at least 2 moles of aromatic alcohol per every 1 mole of organoamide intermediate, or no more than about 2.75 moles of aromatic alcohol per every 1 mole of organoamide intermediate, although the relative amounts can be outside of these ranges.

The acid-terminated organoamide intermediate and the coupling agent can be present in any desired or effect relative amounts, in embodiments at least about 1.8 moles of coupling agent per every 1 mole of organoamide intermediate, or no more than about 3 moles of coupling agent per every 1 mole of organoamide intermediate, although the relative amounts can be outside of these ranges.

The catalyst and the organoamide intermediate can be present in any desired or effect relative amounts, in embodiments at least about 0.05 moles of catalyst per every 1 mole of organoamide intermediate, or no more than about 0.8 moles of catalyst per every 1 mole of organoamide intermediate, although the relative amounts can be outside of these ranges.

Any desired or effective solvent can be employed including the solvents described above. The solvent can be present in any desired or effect relative amounts, in embodiments at least about 20 milliliters of solvent per gram of organoamide intermediate, or no more than about 100 milliliters of solvent per gram of organoamide intermediate, although the amount of solvent can be outside of these ranges.

The reaction between the organoamide intermediate, the aromatic alcohol (or aromatic alcohol and second end-cap component), and the coupling agent can be carried out at any desired or effective temperature, such as at least about 15° C. to about 50° C., or from about 20° C. to about 40° C., or from about 25° C. to about 35° C., although the temperature can be outside of these ranges.

The reaction between the acid-terminated organoamide intermediate, the aromatic alcohol (or aromatic alcohol and second end-cap component), can be carried out for any desired or effective period of time, such as from about 2 hours to about 12 hours, or from about 2 to about 5 hours, or from about 2.5 to about 4 hours, although the period of time can be outside of these ranges.

Subsequent to completion of the reaction, the product can be treated by any desired or effective method, such as filtration of any solid by-products or washing the solution with water depending on the coupling agent used. The solvent can be removed by rotary evaporation. If needed, the product can be purified by washing with acetone and dried in a vacuum oven.

Many of the compounds thus prepared can exhibit gel-like behavior when present in solutions. Examples of materials in which the present compounds can be dissolved include curable monomers such as, for example, propoxylated neopentyl glycol diacrylate, such as SR9003®, commercially available from Sartomer Co. Inc. "Gel-like behavior" refers to that the compounds undergo a relatively sharp increase in viscosity over a relatively narrow temperature range. Some compounds as disclosed herein undergo a change in viscosity of at least about $10^3$ centipoise, at least about $10^5$ centipoise, or at least about $10^6$ centipoise, over a temperature range of at least about 5° C., at least about 10° C., or at least about 30° C., although the viscosity change and the temperature range can be outside of these ranges, and compounds that do not undergo changes within these ranges are also included herein.

Colorant

The phase-change inks disclosed herein may optionally comprise a colorant. The optional colorant, if present, may be present in a colored marking material in any desired amount, for example from about 0.5 to about 75% by weight of the marking material, such as about 1 to about 50% or from about 1 to about 25%, by weight of the marking material.

Any suitable colorant may be used in embodiments herein, including dyes, pigments, or combinations thereof. As colorants, examples may include any dye or pigment capable of being dispersed or dissolved in the vehicle. Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D 1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

Antioxidants

The phase-change inks disclosed herein may also optionally contain an antioxidant. The optional antioxidants can protect the images from oxidation and can also protect the ink components from oxidation during the heating portion of the ink preparation process. Specific examples of suitable antioxidant stabilizers include NAUGARD® 524, NAUGARD® 635, NAUGARD® A, NAUGARD® 1-403, and NAUGARD® 959, commercially available from Crompton Corporation, Middlebury, Conn.; IRGANOX® and IRGASTAB® UV 10, commercially available from Ciba Specialty Chemicals; GENORAD 16 and GENORAD 40 commercially available from Rahn AG, Zurich, Switzerland, and the like, as well as mixtures thereof. When present, the optional antioxidant is present in the ink in any desired or effective amount. For example, the optional antioxidant may be present in an amount from about 0.01 to about 20%, such as about 0.1 to about 10%, or about 1 to about 5%, by weight of the ink carrier.

Printing Apparatus and Process

The present ultraviolet curable phase-change ink materials, as well as the methods herein, may be employed with any desired printing system including systems suitable for preparing three-dimensional objects, such as a solid object printer, thermal ink jet printer (both with inks liquid at room temperature and with phase-change inks), piezoelectric ink jet printer (both with inks liquid at room temperature and with phase-change inks), acoustic ink jet printer (both with inks liquid at room temperature and with phase-change inks), thermal transfer printer, gravure printer, electrostatographic printing methods (both those employing dry marking materials and those employing liquid marking materials), and the like. In other embodiments, the ink materials may be used for manual preparation of three-dimensional objects, such as through the use of molds or by manual deposition of the ink material, to prepare a desired three-dimensional object.

Ink jet printing devices are known in the art. For example, ink jet printing devices are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are generally three types of drop-on-demand ink jet systems. One type of drop-on-demand system is a piezoelectric device that has as its major components an ink-filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate, such as an image receiving member or intermediate transfer member, with respect to the ink jetting head. That is, there is a small translation of the print head with respect to the substrate in between each rotation. This approach simplifies the print head design, and the small movements ensure good droplet registration. At the jet operating temperature, droplets of liquid ink are ejected from the printing device. When the ink droplets contact the surface of the recording substrate, they quickly solidify to form a predetermined pattern of solidified ink drops.

In embodiments, an ink jet printing device as described in commonly assigned, co-pending U.S. patent application of Gabriel Iftime et al, Ser. No. 11/683,011, entitled "Dual Printer for Regular and Raised Print," filed Mar. 7, 2007, incorporated by reference herein in its entirety, may be employed. The ink jet printing apparatus includes at least an ink jet print head and a print region surface toward which ink is jetted from the ink jet print head, wherein a height distance between the ink jet print head and the print region surface is adjustable. Therein, the ink jet print head is adjustable in spacing with respect to the print region surface so as to permit the ink jet print head to be moved from the a first position for regular height printing to a second height distance that is greater than (that is, the spacing between the ink jet print head and the print region surface is greater than) the first height distance. The second height distance is not fixed, and may be varied as necessary for a given printing. Moreover, the second height distance may itself be changed during a printing, as necessary. For example, it may be desirable to adjust the height distance from the first position to a second position as an image is built-up by the ink jet print head, and then as the image continues to be built-up, to adjust the ink jet print head from the second position to a third position in which the spacing from the print region surface is even further increased, and so on as necessary to complete build-up of the object.

In embodiments, the ink jet print head or target stage may be movable in three dimensions, x, y, and z, enabling the build up of an object of any desired size. Moreover, three dimensional objects may be formed with appropriate multiple passing of the ink jet print head over an area to achieve the desired object height and geometry. Jetting of ink from multiple different ink jets of the ink jet print head toward a same location of the image during a single pass may also be used to form raised height objects. As discussed below, in embodiments, each layer of ink may add from about 1 to about 6 mm in height to the image height. Knowing the total print height desired, the appropriate number of passes or jettings may be readily determined.

A controller may then control the ink jet print head to deposit the appropriate amount and/or layers of ink at locations of the image so as to obtain the image with the desired print heights and overall geometries therein.

The ink jet print head may support single color or full color printing. In full color printing, the ink jet print head typically includes different channels for printing the different colors. The ink jet print head may include four different sets of channels, for example one for each of cyan, magenta, yellow and black. In such embodiments, the ink jet print head is capable of printing either full color regular height prints when the ink jet print head is set at a minimum distance from the print region surface, or raised height prints of any color when the ink jet print head is at a distance greater than the minimum distance from the print region surface.

The three-dimensional objects prepared herein may be free-standing parts or objects, rapid prototyping devices, raised structures on substrates, such as, for example, topographical maps, or other desired objects. Any suitable substrate, recording sheet, or removable support, stage, platform, and the like, may be employed for depositing the three-dimensional objects thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, as well as meltable or dissolvable substrates, such as waxes or salts, in the case of removable supports for free-standing objects, and the like.

The ink compositions used in the printing apparatus described above may be prepared by any desired or suitable method. For example, the ink ingredients may be mixed together, followed by heating, to a temperature in embodiments of about 80° C. to about 120° C., and stirring until a homogeneous ink composition is obtained, followed by cooling the ink to ambient temperature (typically from about 20° C. to about 25° C.).

The ink compositions generally have melt viscosities at the jetting temperature (for example, the jetting temperature may be about 50° C. to about 120° C., such as about 60° C. to about 110° C., or about 70° C. to about 100° C.) of about 2 to about 30 centipoise, such as about 5 to about 20 centipoise, or about 7 to about 15 centipoise.

In embodiments, the inks are jetted at low temperatures, in particular at temperatures below about 110° C., such as from about 40° C. to about 110° C., or from about 50° C. to about 110° C., or from about 60° C. to about 90° C. At such low jetting temperatures, the conventional use of temperature differential between the jetted ink and the substrate upon which the ink is jetted to effect a rapid phase-change in the ink (i.e., from liquid to solid) may not be effective. The pliant may thus be used to effect a rapid viscosity increase in the jetted ink upon the substrate. In particular, jetted ink droplets may be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase-change transition in which the ink undergoes a significant viscosity change from a liquid state to a gel state (or semi-solid state).

In embodiments, the temperature at which the ink forms the gel state is any temperature below the jetting temperature of the ink, such as any temperature that is about 5° C. or more below the jetting temperature of the ink. In embodiments, the gel state may be formed at a temperature of about 25° C. to about 100° C., such as about 30° C. to about 70° C. A rapid and large increase in ink viscosity occurs upon cooling from the jetting temperature, at which the ink is in a liquid state, to the gel temperature, at which the ink is in the gel state. The viscosity increase is, in embodiments, at least a $10^{2.5}$-fold increase in viscosity.

When the inks are in the gel state, the viscosity of the ink is in one embodiment at least about 1,000 centipoise, in another embodiment at least about 10,000 centipoise, and in yet another embodiment at least about 100,000 centipoise. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise. The preferred gel phase viscosity may vary with the print process. For example, the highest viscosities are preferred when jetting directly to porous paper, or when employing intermediate transfer, in order to minimize the effects of ink bleed and feathering. On the other hand, less porous substrates such as plastic may lead to the use of lower ink viscosities that control dot gain and agglomeration of individual ink pixels. The gel viscosity may be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation. In the present system, the maximum viscosity reached exceeds these values (about $10^5$ to about $10^6$ centipoise).

In embodiments, successive layers of the curable ink may be deposited to form an object having a selected height and shape. For example, objects of from about 1 to about 10,000 micrometers in height. The successive layers of the curable ink may be deposited to a build platform or to a previous layer of solidified material in order to build up a three-dimensional object in a layer-wise fashion. In embodiments, objects of virtually any design may be created, from a micro-sized scale to a macro-sized scale and may include simple objects to objects having complex geometries. The ink jet materials and method herein further advantageously provide a non-contact, additive process (as opposed to subtractive process such as computer numerical control machining) providing the built-in ability to deliver metered amounts of the present ink materials to a precise location in time and space.

In embodiments, a thickness of the first and each successive layer of the phase-change ink composition may be from about 0.02 to about 6 mm, such as about 0.52 to about 5.5 mm, about 1.02 to about 5 mm, about 1.52 to about 4.5 mm, or from about 2.02 to about 4 mm.

The gel nature of the present materials at room temperature prevents spread or migration of the printed droplet and allows for facile build-up of three-dimensional structures. Although there are no limits to the height or overall size of an object that may be created, very large objects may require intermediate curing in the deposition process. Due to the radiation curable nature of this material, the printed object may be cured by exposure to ultraviolet radiation at any point in the fabrication process resulting in more robust objects with a high degree of mechanical strength. "Curing" means that the curable compounds in the ink undergo an increase in molecular weight upon exposure to actinic radiation, such as crosslinking, chain lengthening, or the like.

In embodiments, the radiation curable phase-change inks disclosed herein may be cured after each layer of the three-dimensional object is deposited. In other embodiments, the inks may be cured upon completion of deposition of all layers of the three-dimensional object. The printed layers with the thickness of about 0.02 to about 6 mm, as described above, reduces the curing steps required to build a mechanically stable object, and further reduces the need to cure each layer after each deposition.

Curing of the ink may be effected by exposure of the ink image to actinic radiation at any desired or effective wavelength. For example, the wavelength may be about 200 to about 480 nanometers. Exposure to actinic radiation may be for any desired or effective period of time. For example, the exposure may occur for about 0.2 to about 30 seconds, such as about 1 to about 15 seconds.

In embodiments, an x, y, z movable substrate, stage, or build platform is employed to create a free-standing object. That is, there is no final substrate since the three-dimensional product is the free-standing, printed or fabricated object and not an image on a substrate. The removable build platform or support material may be any suitable material, for example, in embodiments, a non-curable material. Specific examples of suitable non-curable support materials include waxes, plastics, metals, wood, and glass, among others.

In embodiments, the three-dimensional object may have both rigid and rubbery components. For example, one component may be printed by using material comprising a curable monomer that imparts a lower or higher room temperature modulus than a curable monomer of another component of the object. In embodiments, the three-dimensional object may have alternating rigid and flexible layers within a single object, such as a rubber-like post with a hard cap on the end. In such an example, a low modulus material may initially be printed, followed by a subsequent later of high modulus material, and the printed material may subsequently be cured.

EXAMPLE

The radiation curable phase-change inks were prepared with the compositions according to Tables 1 (Formulation Examples A to D) and 2 (Formulation Examples E and F). In these examples, the Amide Gellant used was capped with SR495B (caprolactone acrylate) and Irgacure 2959 (photoinitiator). A comparative control sample was also prepared where the monomer is solely composed of SR9003 acrylate monomer (75.3%).

TABLE 1

Preparation of radiation curable phase-change ink where the monomer is one of CN3003 (acrylic monomer + hydrocarbon tackifier) (A), RICON ® 130MA8 (polybutadiene adducted with maleic anhydride) (B), CN3001 (aliphatic urethane acrylate + hydrocarbon tackifier) (C), or CN2262 (polyester acrylate) (D).

| Component | Wt Percent (%) | Mass (g) |
|---|---|---|
| Amide Gellant | 7.5 | 1.5 |
| U-350 Acrylate | 5.0 | 1.0 |
| Irgastab UV10 | 0.2 | 0.04 |
| Irgacure 819 | 1.0 | 0.2 |

TABLE 1-continued

Preparation of radiation curable phase-change ink where the monomer is one of CN3003 (acrylic monomer + hydrocarbon tackifier) (A), RICON ® 130MA8 (polybutadiene adducted with maleic anhydride) (B), CN3001 (aliphatic urethane acrylate + hydrocarbon tackifier) (C), or CN2262 (polyester acrylate) (D).

| Component | Wt Percent (%) | Mass (g) |
|---|---|---|
| Irgacure 127 | 3.5 | 0.7 |
| MONOMER (A-D) | 25.0 | 5.0 |
| SR 9003 acrylate monomer | 50.3 | 10.06 |
| Total | 100.0 | 20.0 |

TABLE 2

Preparation of radiation curable phase-change ink where the monomer is one of 3-acryloxypropyltrimethoxysilane (E) or acryloxypropyl-t-structured siloxane (F).

| Component | Wt Percent (%) | Mass (g) |
|---|---|---|
| Amide Gellant | 7.5 | 1.5 |
| U-350 Acrylate | 5.0 | 1.0 |
| Irgastab UV10 | 0.2 | 0.04 |
| Irgacure 819 | 1.0 | 0.2 |
| Irgacure 127 | 3.5 | 0.7 |
| MONOMER (E, F) | 50.0 | 10 |
| SR 9003 acrylate monomer | 32.8 | 6.56 |
| Total | 100.0 | 20.0 |

The jetting viscosity, yield strain and gel points for formulations using monomers (A)-(F) as compared to the comparative control SR9003 monomer are provided in Table 3.

TABLE 3

The jetting viscosity, yield strain and gel points for formulations using monomers (A)-(F) as compared to the comparative control SR9003 monomer. Rheological data were collected using an RFS-III controlled strain instrument from TA Instruments. Jetting temperature viscosities were determined using either a cone and plate or parallel plate geometry together with a dynamic temperature step test or static rate sweep test. The gel point is defined as the temperature in the dynamic temperature step test at which the loss modulus and elastic modulus are equal in value. Yield strains were determined as the inflection point in a dynamic strain sweep test at room temperature.

| Formulation | Name | Jetting Viscosity (centipoise) | Yield Strain (%) | Gel point (° C.) |
|---|---|---|---|---|
| (A) | Acrylic monomer and tackifier (CN 3003) | 5.40 | 7.9 | 60.9 |
| (B) | Polybutadiene adducted with maleic anhydride (RICON ® 130MA8) | 15.93 | 6.3 | 56.9 |
| (C) | Aliphatic urethane acrylate and tackifier (CN 3001) | 7.39 | 6.3 | 59.7 |
| (D) | Polyester acrylate (CN 2262) | 5.67 | 5 | 59.4 |
| (E) | 3-Acryloxypropyltrimethoxysilane (Silane) | 1.77 | 5 | 61.4 |
| (F) | Acryloxypropyl t-structured siloxane (T-Silane) | 2.77 | 0.4 | 58.1 |
| SR 9003 (comparative control) | Propoxylated neopentyl glycol diacrylate | 5.00 | 12 | 60.0 |

Each formulation was cured as a very thick (1-5 mm) film by 2-3 passes beneath a 600 W LIGHT HAMMER® lamp (D bulb), available from Fusion UV Systems, Inc., on a conveyor traveling at 32 feet per minute. The cured samples were then cut into the appropriate dimensions for dynamic mechanical analysis (DMA). The samples were subjected to dynamic strain and temperature sweeps using a Q800 DMA from TA instruments employing a tension clamp. The storage modulus (a measure of stiffness) at room temperature and Tg are given in Table 4.

TABLE 4

Room temperature modulus and Tg for formulations using monomers (A)-(F).

| Formulation | Name | Modulus at RT (MPa) | Tg (° C.) |
|---|---|---|---|
| (A) | Acrylic monomer and tackifier (CN 3003) | 98.65 | 10.41 |
| (B) | Polybutadiene adducted with maleic anhydride (RICON ® 130MA8) | 107.9 | 30.93 |
| (C) | Aliphatic urethane acrylate and tackifier (CN 3001) | 591.4 | 21.19 |
| (D) | Polyester acrylate (CN 2262) | 733.9 | 43.82 |
| (E) | 3-Acryloxypropyltrimethoxysilane (Silane) | 1.582 | <−45 |
| (F) | Acryloxypropyl t-structured siloxane (Silane T-structured) | 9.511 | 0.05 |
| SR 9003 (comparative control) | Propoxylated (2) neopentyl glycol diacrylate | 1020 | 55.5 |

As indicated in Table 4, formulations using monomers (A)-(F) have storage modulus values in a range that spans more than 700 MPa, resulting in materials that go from slightly to very flexible. The comparative control formulation using monomer SR 9003 has a storage modulus value that is greater than 1000 MPa. The materials set described herein will provide the advantage of phase-change behavior that allows the build-up of thick features in between curing steps. An additional advantage is the ability to print dual-property objects, i.e. objects having both rigid and rubbery components.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A phase-change ink set comprising:
a first ink composition, and
at least one other ink composition,
wherein each ink composition has a different room temperature storage modulus of from about 0.01 to about 5 GPa,
wherein the first ink composition and/or the at least one other ink composition comprises an amide gellant and a radiation curable monomer,
wherein the radiation curable monomer is selected from the group consisting of polybutadiene adducted with maleic anhydride, 3-acryloxypropyltrimethoxysilane, and acryloxypropyl t-structured siloxane.

2. The phase-change ink set of claim 1, wherein the ink set comprises 2 to 10 different ink compositions.

3. A phase-change ink set comprising:
a first ink composition, and
at least one other ink composition, wherein the first ink composition and/or the at least one other ink composition comprises an amide gellant and a radiation curable monomer, at least one radiation curable monomer being selected at from the group consisting of polybutadiene adducted with maleic anhydride, aliphatic urethane acrylate, polyester acrylate, 3-acryloxypropyltrimethoxysilane, and acryloxypropyl t-structured siloxane, and further wherein each ink composition has a different room temperature storage modulus of from about 0.01 to about 5 GPa.

4. The phase-change ink set of claim 3, wherein the ink set comprises 2 to 10 different ink compositions.

5. The phase-change ink set of claim 3, wherein one of the radiation curable monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, and mixtures thereof.

6. The phase-change ink set of claim 3, wherein the radiation curable monomer is selected from the group consisting of polybutadiene adducted with maleic anhydride, 3-acryloxypropyltrimethoxysilane, and acryloxypropyl t-structured siloxane.

7. The phase-change ink set of claim 4, wherein the ink set comprises 5 to 10 different ink compositions.

8. The phase-change ink set of claim 3, wherein the first ink composition has a room temperature storage modulus of from about 0.01 to about 2.5 GPa and the at least one other ink composition has a room temperature storage modulus of from about 2.5 to about 5 GPa.

9. The phase-change ink set of claim 3, wherein the different room temperature storage modulus of each ink composition spans a range of more than 700 MPa.

* * * * *